United States Patent
Meyer et al.

(10) Patent No.: US 11,652,779 B1
(45) Date of Patent: *May 16, 2023

(54) SYSTEMS AND METHODS FOR CACHING EMAILS FOR SUBSEQUENT DELIVERY

(71) Applicant: UIPCO, LLC, San Antonio, TX (US)

(72) Inventors: Gregory Brian Meyer, San Antonio, TX (US); Mark Anthony Lopez, Helotes, TX (US); Nolan Serrao, Plano, TX (US); Victor Kwak, Frisco, TX (US); Ryan Thomas Russell, The Colony, TX (US); Christopher Russell, The Colony, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,295

(22) Filed: Jun. 16, 2022

Related U.S. Application Data

(63) Continuation of application No. 16/887,340, filed on May 29, 2020, now Pat. No. 11,394,681.

(Continued)

(51) Int. Cl.
*G06F 15/16* (2006.01)
*H04L 51/58* (2022.01)
(Continued)

(52) U.S. Cl.
CPC .......... *H04L 51/58* (2022.05); *G06Q 10/107* (2013.01); *H04L 51/212* (2022.05);
(Continued)

(58) Field of Classification Search
CPC ......... H04L 51/38; H04L 51/12; H04L 51/26; H04L 67/2857; H04L 51/00; H04L 51/14;
(Continued)

(56) References Cited

U.S. PATENT DOCUMENTS

| | | | |
|---|---|---|---|
| 6,226,670 B1 * | 5/2001 | Ueno | H04L 51/214 340/9.1 |
| 10,261,672 B1 * | 4/2019 | Dolbakian | G06F 3/04883 |

(Continued)

OTHER PUBLICATIONS

Non-Final Office Action dated Nov. 12, 2021 for U.S. Appl. No. 16/887,340.

(Continued)

*Primary Examiner* — Dustin Nguyen
*Assistant Examiner* — Hao H Nguyen
(74) *Attorney, Agent, or Firm* — Plumsea Law Group, LLC

(57) ABSTRACT

A system and method for improving the download time of emails in an environment in which a server distributes emails to persons working in close proximity to each other. When these persons receive multi-recipient emails intended for several or all of these persons, the server distributing the emails delivers the multi-recipient emails to the first one of the persons who logged on to read his or her emails on his or her personal computer, for distribution to the other persons over a personal area network. This reduces the download time for the persons downloading their emails at a subsequent time.

20 Claims, 12 Drawing Sheets

Related U.S. Application Data

(60) Provisional application No. 62/855,824, filed on May 31, 2019.

(51) Int. Cl.
| | | |
|---|---|---|
| *H04W 4/80* | (2018.01) | |
| *H04L 67/5683* | (2022.01) | |
| *H04L 51/226* | (2022.01) | |
| *H04L 51/212* | (2022.01) | |
| *G06Q 10/107* | (2023.01) | |

(52) U.S. Cl.
CPC ........ *H04L 51/226* (2022.05); *H04L 67/5683* (2022.05); *H04W 4/80* (2018.02)

(58) Field of Classification Search
CPC . H04L 51/28; H04L 67/2842; H04L 12/1854; H04L 12/189; H04L 45/16; H04W 4/80; H04W 8/005; G06Q 10/107
See application file for complete search history.

(56) References Cited

U.S. PATENT DOCUMENTS

| | | | | |
|---|---|---|---|---|
| 2004/0078447 A1* | 4/2004 | Malik | ...................... | H04L 69/08 709/206 |
| 2005/0080861 A1* | 4/2005 | Daniell | ................ | G06Q 10/107 709/206 |
| 2007/0094334 A1* | 4/2007 | Hoffman | .............. | G06Q 10/107 709/206 |
| 2008/0040437 A1* | 2/2008 | Agarwal | .................. | H04L 51/56 709/206 |
| 2008/0064422 A1* | 3/2008 | Scholl | .................. | H04L 12/1854 455/466 |
| 2009/0016504 A1* | 1/2009 | Mantell | ................. | H04L 51/066 379/101.01 |
| 2010/0011077 A1* | 1/2010 | Shkolnikov | ........... | H04L 51/063 709/206 |
| 2010/0017607 A1* | 1/2010 | Shkolnikov | ............. | H04L 51/48 713/168 |
| 2010/0077037 A1* | 3/2010 | Turakhia | ................. | H04L 51/00 709/206 |
| 2010/0153500 A1* | 6/2010 | O'Sullivan | .......... | G06Q 10/107 709/206 |
| 2010/0167763 A1 | 7/2010 | Bouthemy | | |
| 2011/0029615 A1* | 2/2011 | Shaffer | ................ | G06Q 10/107 715/752 |
| 2013/0262589 A1* | 10/2013 | Dubovik | ............... | H04L 51/234 709/206 |
| 2014/0258439 A1* | 9/2014 | Arseniev | ................. | H04L 67/51 709/213 |
| 2014/0372551 A1* | 12/2014 | Fleck | .................... | H04W 8/005 709/213 |
| 2016/0373392 A1* | 12/2016 | Kamal | ................ | H04L 61/4555 |
| 2017/0006131 A1* | 1/2017 | Dennis | ................ | H04L 67/1097 |
| 2020/0104728 A1* | 4/2020 | Lakshmanan | ........ | G06Q 10/107 |

OTHER PUBLICATIONS

Notice of Allowance dated Mar. 23, 2022 for U.S. Appl. No. 16/887,340.

* cited by examiner

SYSTEMS AND METHODS FOR CACHING EMAILS FOR SUBSEQUENT DELIVERY

CROSS-REFERENCE TO RELATED APPLICATIONS

This application is a continuation of and claims benefit to U.S. patent application Ser. No. 16/887,340, filed on May 29, 2020, and titled "Systems And Methods For Caching Emails For Subsequent Delivery," which application claims the benefit of Provisional Application No. 62/855,824, filed May 31, 2019, and titled "Systems And Methods For Caching Emails For Subsequent Delivery," the disclosures of all of which applications are incorporated by reference herein in their entirety.

TECHNICAL FIELD

This disclosure relates generally to systems and methods for caching multiple-recipient emails for subsequent delivery over a personal area network.

BACKGROUND

When a group of users who are often all the recipients of the same email from a particular source all log on to the same local area network (LAN) at approximately the same time, the emails may download relatively slowly simply due to the temporary congestion on the LAN. The congestion and consequent slow delivery occurs because the LAN has to distribute the emails to everyone in the group at roughly the same time. For example, a group of office workers all working in the same field or on the same project may all receive the same emails from their management, from their supervisor, or from another colleague. The delivery of these multiple-recipient emails may occur at the same time, for example they may occur when the office workers start their day by logging on to the office server and start opening up their email applications (such as Microsoft Outlook, for example). This surge in demand at the beginning of the workday may strain the resources of the office system, thus causing the emails to download very slowly for each of the office workers. The same issue may also cause slow email downloads in other environments, such as in universities, hospitals, volunteer organizations and other institutions.

For these reasons, there is a need for systems and methods that reduce the email download time for recipients of multiple-recipient messages such as emails and text messages, for example.

SUMMARY

In one aspect, embodiments include a system for delivering multi-recipient emails to a group of personal computers. The system has a server in communication with the group of personal computers over a local area network. Each of the personal computers in the group of personal computers has an email cache, and the server is configured to download all multi-recipient emails into the email cache of the personal computer that is first used to read emails at a beginning of a particular day. This personal computer is also configured to then distribute the multi-recipient emails over a personal area network to each of the addressees' personal computers as each of the addressees' personal computers is used to read emails.

In another aspect, embodiments include a method for distributing emails to a group of persons who are users of personal computers that are in direct communication with each other over a personal area network. The process starts by receiving at a server a number of multi-recipient emails addressed to at least one person in the group. The server then monitors the status of the personal computers, starting at a predetermined time early in a workday, and identifies which personal computer was first used on the workday to access an email account. The server then also distributes the multi-recipient emails to the identified personal computer that was first used on the workday to access the email account. Then that personal computer distributes the multi-recipient emails over the personal area network to each of the addressees of the multiple-recipient emails when each such addressee logs in to an email account. The server then distributes the multi-recipient emails to any addressees of the multi-recipient emails who are not among the persons who are the users of the personal computers. This step may be performed any time after the receipt of the multi-recipient emails.

In another aspect, a method for reducing email download time for persons working on personal computers that are in communication with each other over a personal area network includes receiving multi-recipient emails from a server at a first one of the personal computers that is the first one of the personal computers that is used to access emails, then storing the multi-recipient emails in an email cache in the first one of the personal computers. The first one of the personal computers then monitors the status of the other personal computers that are in communication with each other over the personal area network, and successively distributes each of the multi-recipient emails to their addressees as those addressees access their email accounts.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide systems and methods for reducing the download time for emails received by recipients of multiple-recipient emails. The embodiments disclosed herein are applicable in a variety of environments, such as office environments, university environments, volunteer organizations and other environments where several persons are the designated recipients for multiple-recipient emails. For the sake of simplicity, the embodiments will be described herein in an office environment. However, they are equally applicable to a variety of environments, as noted above.

The terms "desktop computers," "personal desktop computers" and "personal computers" are used interchangeably in this disclosure, such that any of these terms refers to personal computers including desktop computers, laptop computers, computers stored under a desk, computers stored above a desk or computers stored next to a desk. The terms "recipient" and "addressee" are also used interchangeably in this disclosure. The terms "member" and "employee" shall be used to refer to persons who are associated with a particular institution, such as employees working for a company, a government agency, or a commercial organization; members of a fraternal order; members of a social club or of a recreational club; members of a religious institution; students at a university; and other types of social, communal or commercial enterprises.

Figure 1:
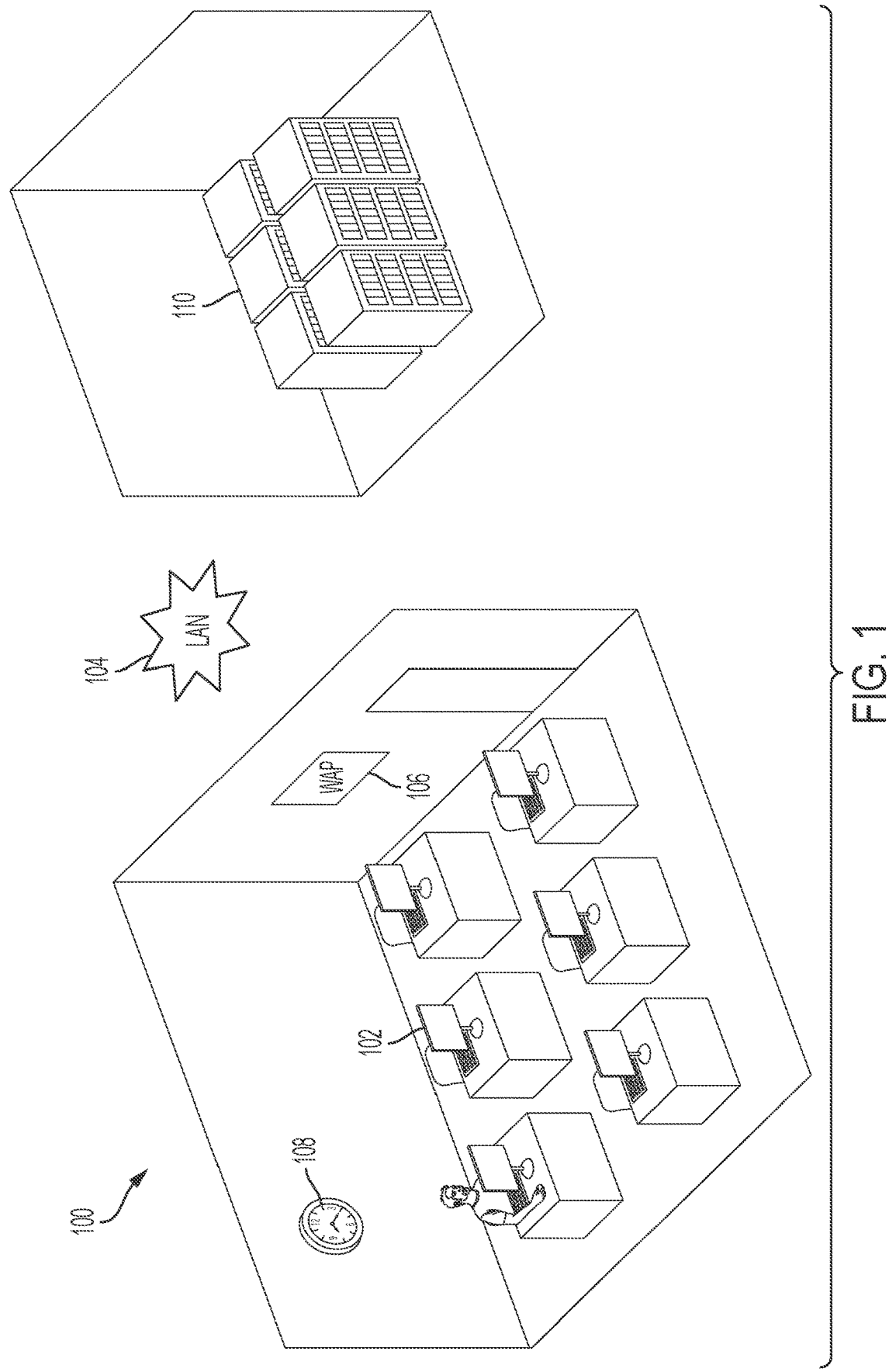
FIG. 1 is a perspective view of an office environment with one employee working on his desktop computer at an early time in the morning.

In this exemplary office environment, a server distributes emails to the employees working in the office. In this example, the members are the employees working in an office whose personal computers are commonly associated with the same access point. When the employees arrive for work in the morning (for example), they routinely log onto their desktop computers or personal computers and work their way through the emails they may have received overnight or while they were away from their desks. Often, a group of employees working in the same field or working on the same project may be situated together, with their desks in adjoining rows, as shown in FIG. 1. In this case, the employees' desktop computers or personal computers are in such close proximity to each other so that they can communicate directly with each other over a wireless Personal Area Network (or WPAN). The signals in WPANs may be carried over a low-powered short-distance wireless technology such as Bluetooth and others operating under IEEE 802.15 standards. For convenience, the group or the employees in this group may be referred-to below as "an employee group," "group employees" or "employees in the group" or similar language.

In this example, each of the employees in this group has two wireless apps on their desktop computers or personal computers, one app for communicating with the server over the office LAN, and another app for communicating directly with all, several or one of the other desktop computers used by the employees in the group over the PAN. Embodiments described herein would also apply to systems that communicate over cable networks instead of over wireless networks. Specifically, both the LAN and the PAN may be wireless, or one or both of the LAN and the PAN may be a cable network.

In an embodiment, the office the employees work in has a Wireless Access Point (WAP) which is in communication with a server via cables or over a WLAN. The WAP is then in wireless communication with each of the employees' personal desktop computers. Thus, in this embodiment, communications from the server are transmitted to the WAP which in turn transmits them to the employees' personal desktop computers.

In an embodiment, when the first employee in a particular group of employees arrives at work and logs on to his or her desktop or personal computer, the server downloads all of the emails that designate her or any one or several of the members of the employee group as a recipient into an email cache on her desktop or personal computer. These emails would include emails addressed to herself alone, as well as emails addressed to herself and to one or more of her colleagues in the group, and emails addressed to other members of the employee group.

As each of the other addressees of the group emails logs on to his or her desktop or personal computer later on in the workday, the email app transmits emails addressed to that particular employee to that particular employee's desktop or personal computer over the PAN. Because the PAN is transmitting over a relatively short distance, the transmission of the emails to the later-arriving employees is very fast such that the later-arriving employees can download their emails much faster than if all employees in the group were downloading their emails from the server at roughly the same time. This also reduces the burden on the LAN, since it no longer has to transmit the emails to the other recipients of the multiple-recipient emails.

Multi-recipient emails that are addressed to both persons within the group and persons outside the group are delivered to the persons outside the group using the normal procedures for delivering emails. The emails are delivered to persons within the group using the procedures described below. Also, in some environments, emails may be classified as "public," "internal," "confidential" or "restricted." If encryption is not applied to any of these classes of emails, then in some embodiments only "public" and "internal" emails might be cached, while "confidential" or "restricted" emails might be delivered directly to their intended recipients. On the other hand, if the "confidential" or "restricted" emails are encrypted, then those encrypted emails could be cached as well.

FIG. 1 is a perspective view of an office environment, showing two rows of three desks. Each of the desks has a desktop computer. A first-to-arrive employee is reading his emails at one of the desks. The clock 108 on the wall reads about 8:20. The office has a server 110 in a separate room which communicates with each of the employees' desktop computers 102 over a LAN, which may be a wired LAN, a wireless LAN, or a combination of a wired or wireless LAN and a WAP and wireless communication from the WAP to the employees' personal desktop computers using, for example, the IEEE 802.11 protocol.

Figure 2:
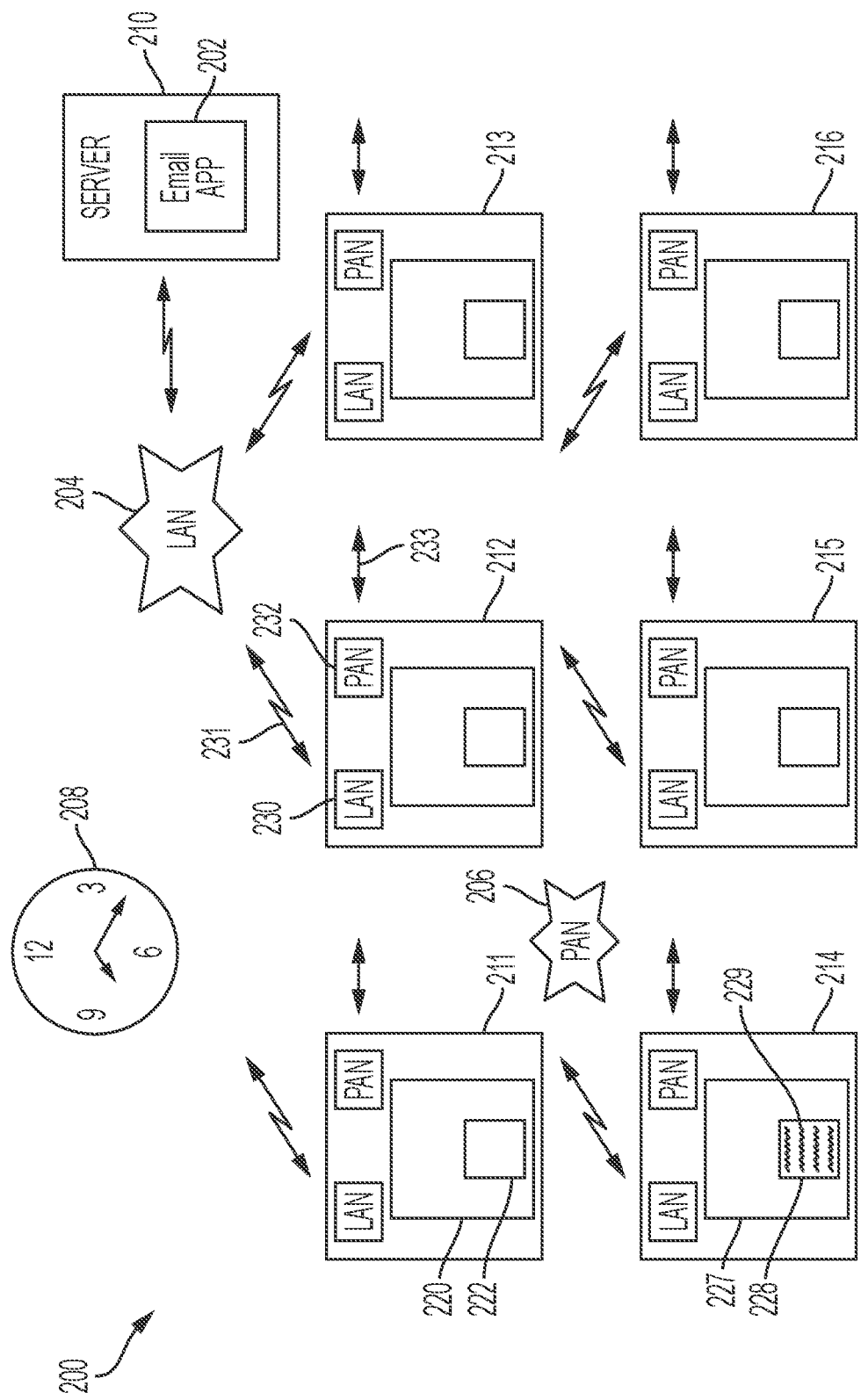
FIG. 2 is a schematic block diagram showing the disposition of emails on the employees' computers at the early time, in an embodiment.

FIG. 2 is a schematic block diagram 200 showing the communications between an email app 202 on a server 210 and each of the employees' desktop computer 211, desktop computer 212, desktop computer 213, desktop computer 214, desktop computer 215 and desktop computer 216 over LAN 204. In some embodiments, LAN 204 may be using electromagnetic waves 231 operating according to an IEEE 802.11 protocol, for example to communicate directly with the personal desktop computers (in which case a WAP may not be needed). In other embodiments, LAN 204 may alternatively be in wired or wireless communication with a WAP 106 (not shown in FIG. 2 or FIG. 4), which then communicates wirelessly with the employees' personal desktop computers. FIG. 2 also shows that the employees' desktop computers 211 to 216 can also communicate directly with each other over a PAN 206, which may be a wireless or a wired network. In a wireless embodiment, PAN 206 may be using electromagnetic waves 233 operating according to an IEEE 802.15 protocol, for example. Finally, in some embodiments all communications between the various devices may be over a wired network.

As shown in FIG. 2, each of the desktop computers 211, desktop computer 212, desktop computer 213, desktop computer 215 and desktop computer 216 has an email app 220 with an email cache 222. In this example, the first employee to log on for the day was using desktop computer 214. Desktop computer 214 has an email app 227 with an email cache 228. Email cache 228 contains a number of multi-recipient emails 229 that are being stored in email cache 228 for delivery later on as each subsequent employee logs on to his or her email account. At this time, only the first employee to log in has any emails 229 in his email cache 228. For clarity, the email caches in desktop computer 211, desktop computer 212, desktop computer 213, desktop computer 215 and desktop computer 216 are shown as being empty in FIG. 2, although it should be understood that ordinarily the employees may have several emails that were received on previous days in their email cache.

The second employee to log in may now receive his or her copies of all of the emails that list him or her as an addressee by direct transmission over PAN 206 from desktop computer 214 as soon as he or she logs on to his or her email account. This procedure is followed as each successive employee logs on to receive his or her emails. Because these direct transmissions take place over PAN 206, they are delivered much faster that if they were being transmitted from server 210.

Figure 3:
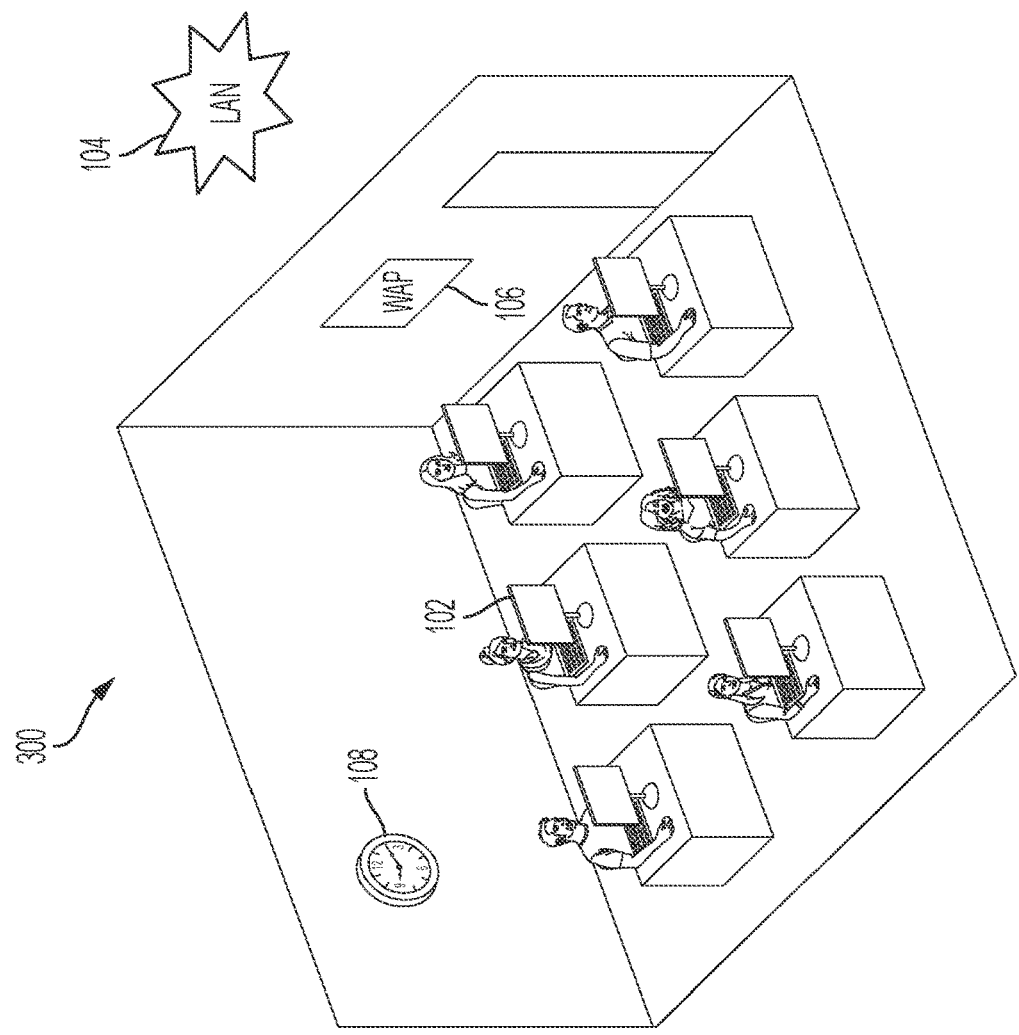
FIG. 3 is a perspective view of the office environment shown in FIG. 1 with all six employees working on their desktop computers at a later time.
Figure 4:
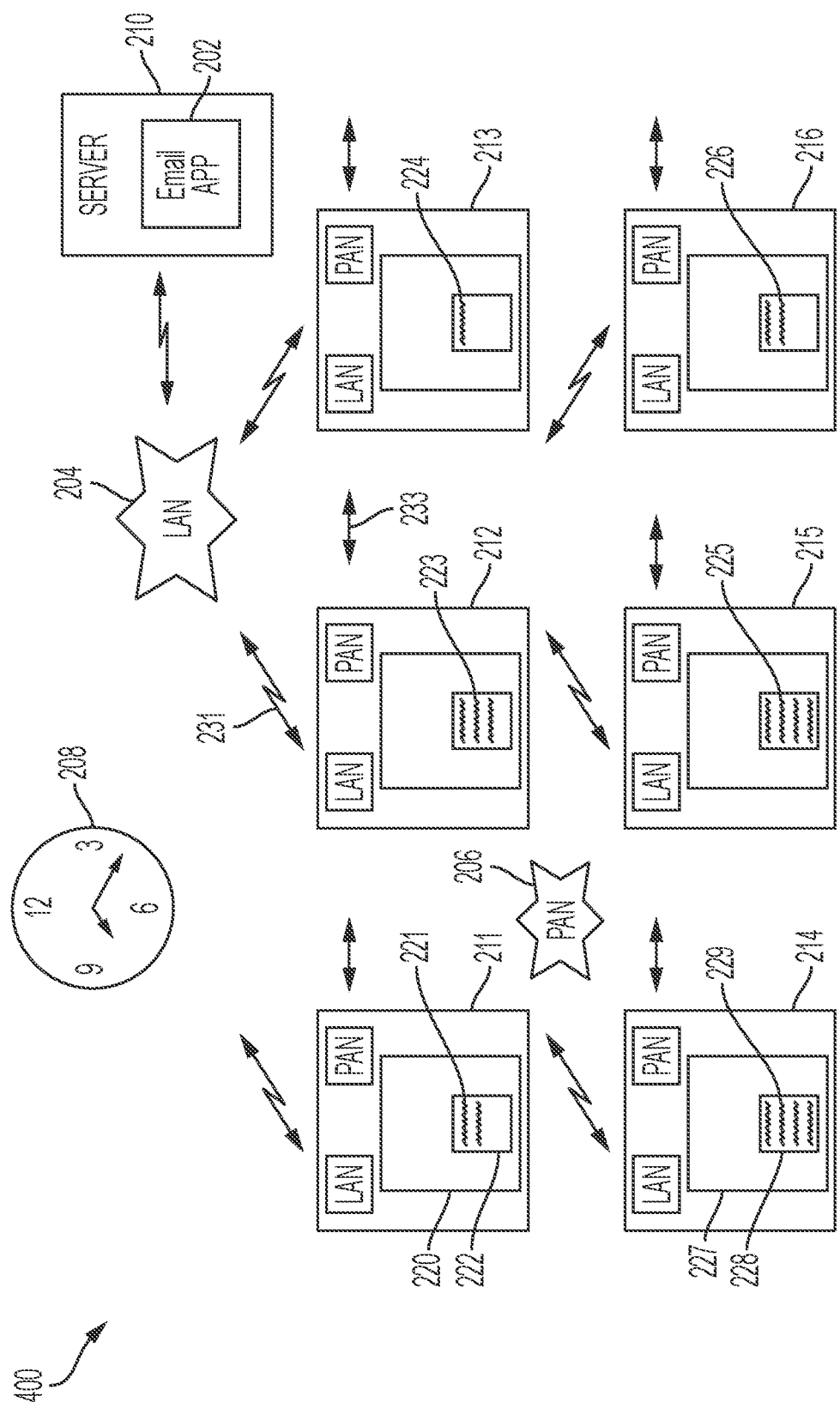
FIG. 4 is a schematic block diagram showing the disposition of emails on the employees' computers at the later time, in an embodiment.

This sequence of email delivery is illustrated in FIG. 3 and FIG. 4. FIG. 3 is a perspective view of the office 300 at a later time. The clock 108 on the wall now reads about 9:10. At this time, in this example, each of the employees is at his or her desk, and has logged into the system. In the FIG. 3 illustration, the employees' desktop computers 102 communicate wirelessly with server 110 over wireless LAN 104, and in some embodiments also via WAP 106. However, as noted above, the communications may also take place over a cable network.

As shown in the schematic diagram 400 of FIG. 4, at this later time the first employee's personal desktop computer 214 has delivered the multiple-recipient emails to their respective addressees. In this example, desktop computer 211 has two multiple-recipient emails 221 in its email cache 222. Similarly, desktop computer 212 has three multiple-recipient emails 223 in its email cache, desktop computer 213 has one multi-recipient email 224 in its email cache, desktop computer 215 has four multiple-recipient emails 225 in its email cache and desktop computer 216 has two multi-recipient emails in its email cache. In an embodiment, desktop computer 214 grants priority to applications executing on desktop computer 214 (other than the distribution of emails) over the distribution of emails to other desktop computers.

Figure 5:
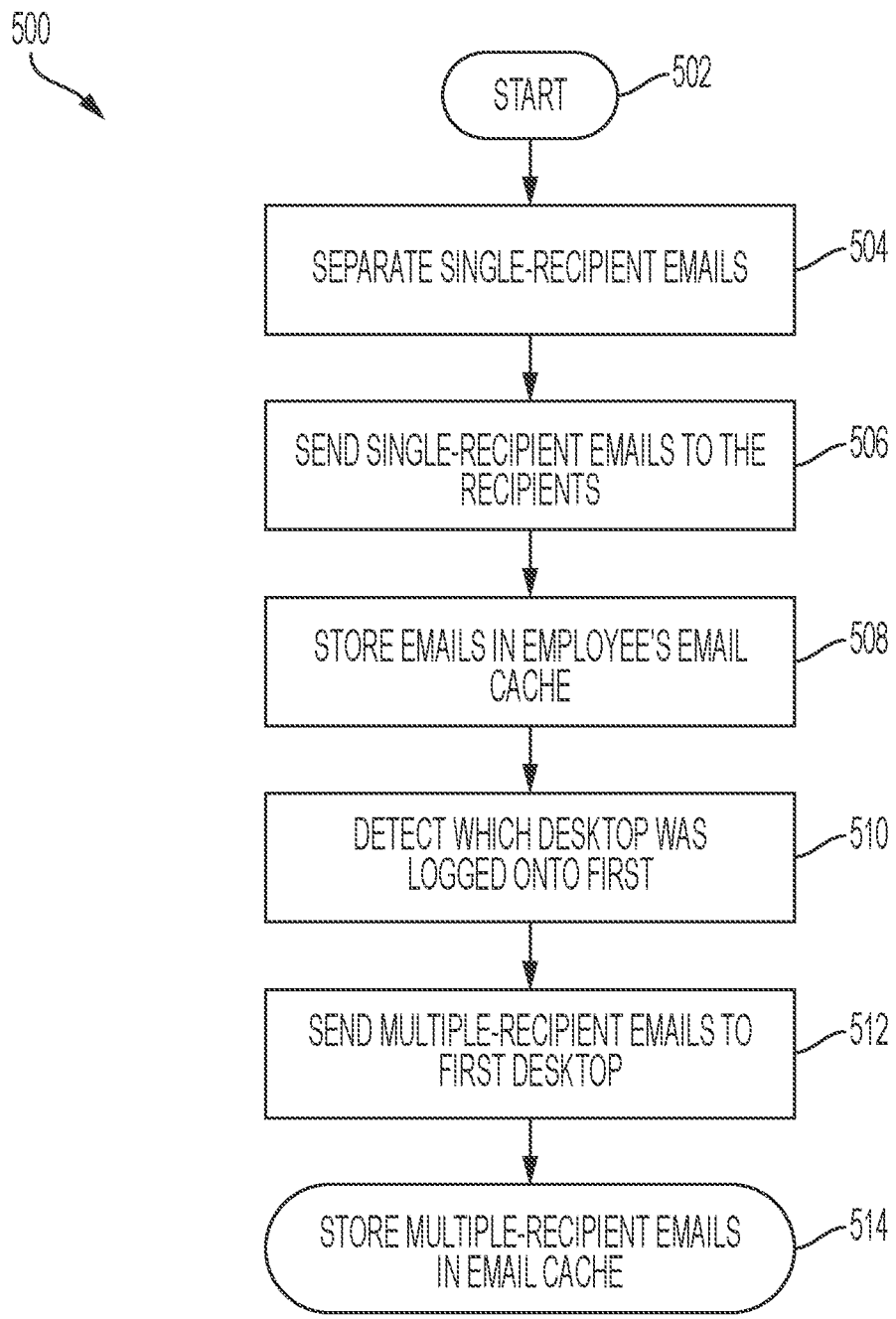
FIG. 5 is a flowchart showing the disposition of emails when the first employee logs on to the system, in an embodiment.

FIG. 5 is an exemplary flowchart 500 that may be used to distribute the emails received in the personal or desktop computer of the first employee to log on to his or her email account. The process starts at step 502, when the first employee logs on. In step 504, the email app 202 in server 210 (shown in FIG. 2 and FIG. 4) separates the single-recipient emails from the multi-recipient emails. In step 506, email app 202 sends the single-recipient emails to their recipients. However, in some embodiments, if encryption is not used for "confidential" or "restricted" emails, then those emails could be sent directly to their intended recipients in step 506. In step 508, the emails received by employees within the employee group are stored in the respective employee's email cache. In step 510, email app 202 determines which desktop personal computer was the first one used to access the user's email account. In step 512, app 202 sends the multiple recipient emails that include one or more of the members of the employee group as an addressee to that desktop personal computer. In step 514, the desktop personal computer stores the multi-recipient emails in its email cache. In some embodiments, the first employee can only read emails that include her as an addressee. In some cases, she cannot even see those emails.

In some embodiments, the server could use, for example, PKI encryption to encrypt a version of the emails specific to each one of that email's multiple recipients. In this example, the server would actually send several versions of the same email to the first desktop computer. These emails would each be encrypted with the public key of a specific addressee of the emails. Thus if an email has four addressees, four versions of that email would be stored on the first desktop personal computer, for example, one for Mr. Black, one for Ms. White, one for Ms. Green and one for Mr. Brown. Mr. Black's email would be encrypted using Mr. Black's public key; Ms. White's email would be encrypted using Ms. White's public key; Ms. Green's email would be encrypted with Ms. Green's public key; and Mr. Brown's email would be encrypted with Mr. Brown's public key. With this system, the emails could only be read by the user who is the specific addressee of that email.

In some embodiments, the server may also execute a validation step such as a checksum validation and/or use a non-repudiation process to confirm the integrity of the emails and/or make sure that the sender of the email cannot repudiate his or her authorship of the email. Also, in some embodiments the server might rely on quality of service (QoS) and/or storage issues in determining whether or not to cache emails in a particular desktop computer.

Figure 6:
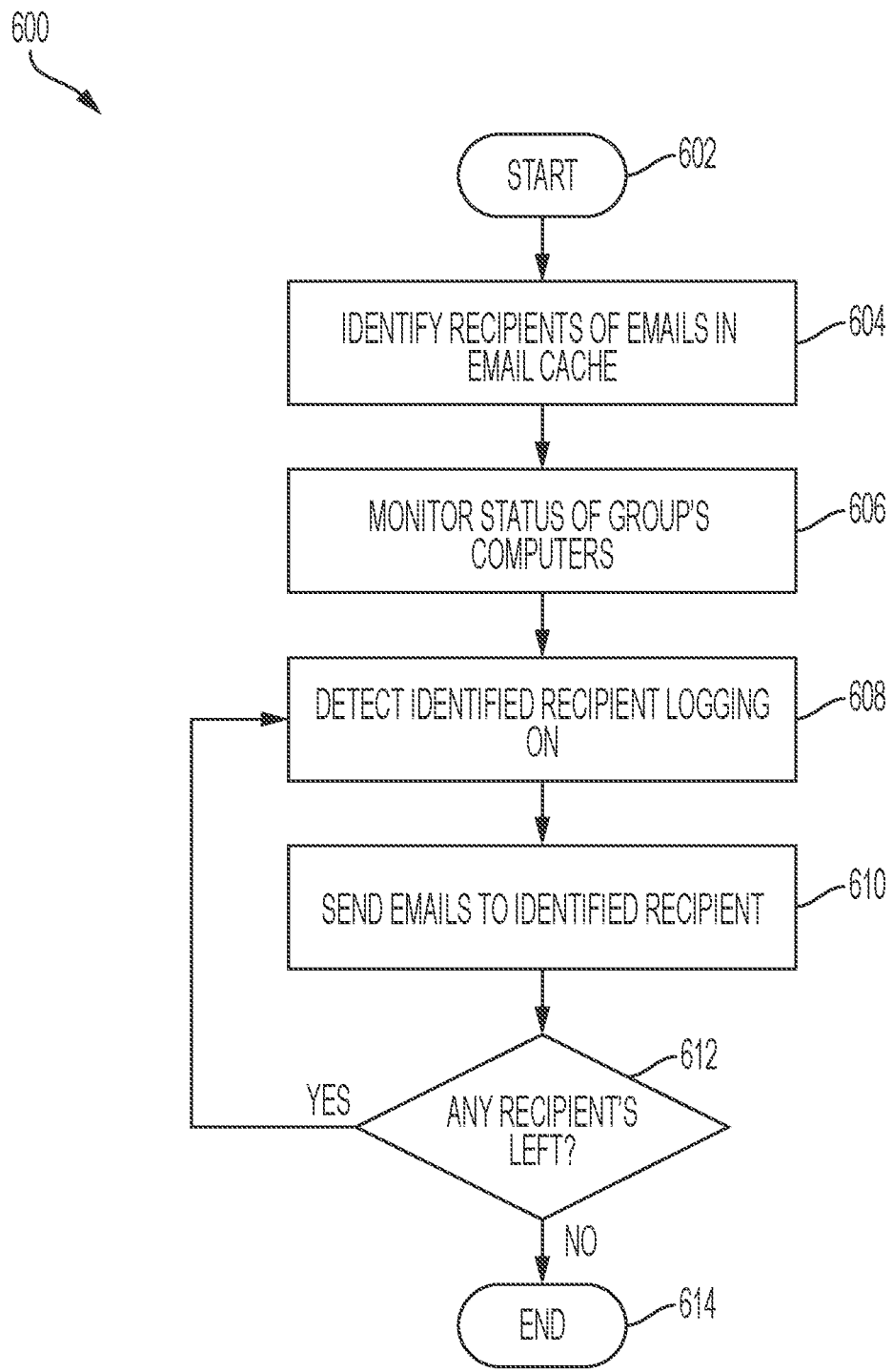
FIG. 6 is a flowchart showing the disposition of emails as recipients of the emails log on to start their workday, in an embodiment.

The first employee's desktop personal computer then distributes the multi-recipient emails to their addressees. An exemplary flowchart 600 for this process is shown in FIG. 6. The process starts in step 602 when the first employee accesses his or her emails at the beginning of the workday. In step 604, the computer identifies the recipients of emails stored in the email cache. In step 606, the computer monitors the status of the computers used by the group of employees. In step 608, the computer identifies one of the group employees who has logged on to his or her email account. In step 610, the computer sends the multi-recipient emails that include that identified employee as one of its addressees to the identified employee's computer. In step 612, the computer checks to see if there are any employees within the employee group that have not yet been sent their multi-recipient emails. If there are still one or more employees who have not yet received their multi-recipient emails, the process returns to step 608, so that subsequent employees may be detected as they log on. If all the group employees have been sent their multi-recipient emails, the process ends in step 614.

Figure 7:
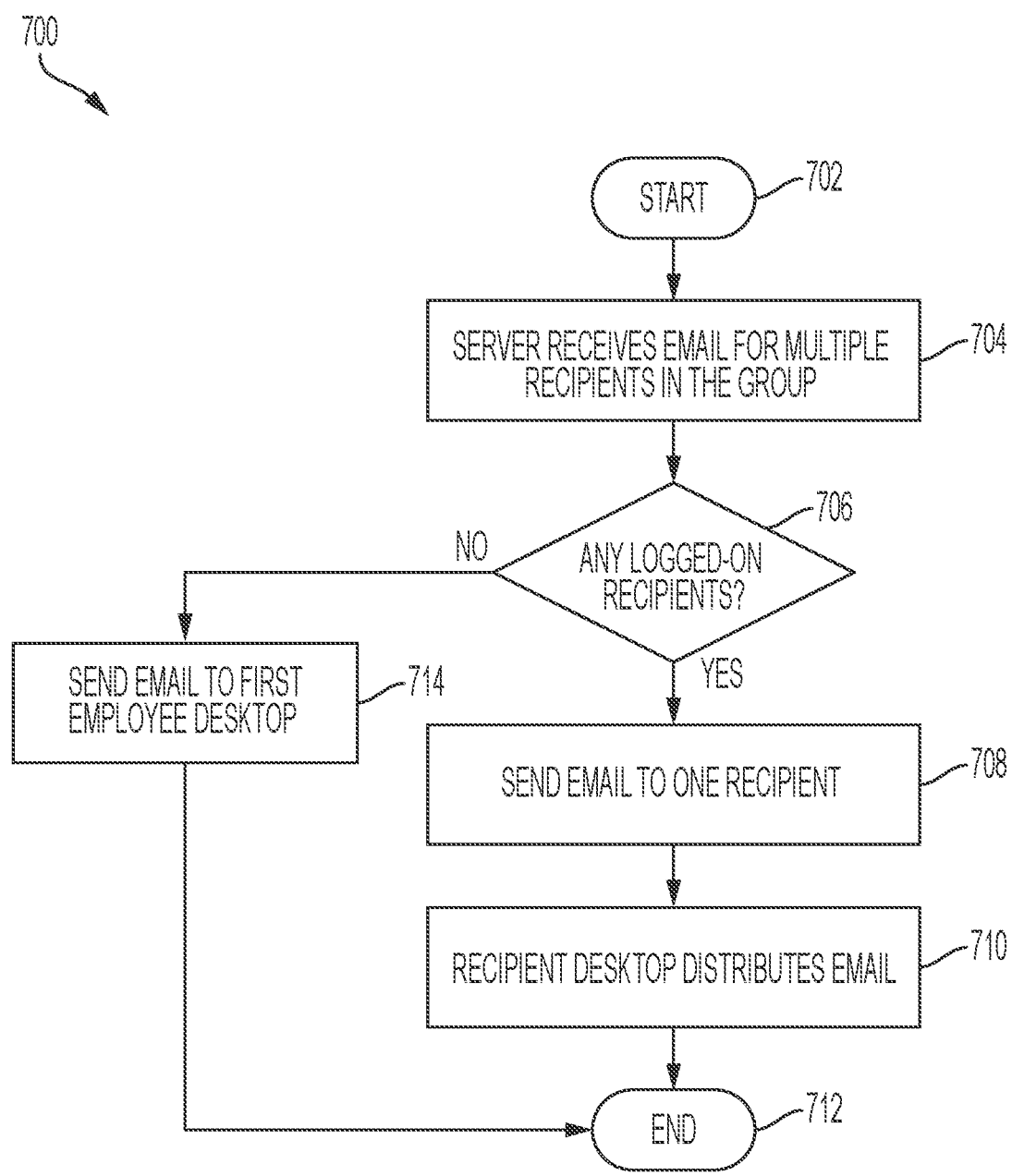
FIG. 7 is a flowchart showing the disposition of emails received at a subsequent time, in an embodiment.

FIG. 7 is a flowchart 700 showing an optional process for the disposition of emails received at a subsequent time, i.e., after the early-morning set of multiple-recipient emails have been sent to the first employee's personal or desktop computer. It should be understood, however that, if the process shown in FIG. 7 is not used, then the emails may be distributed to each of their addressees as they are received by server 210. This optional process starts in step 702 at a predetermined period after the first desktop computer has finished distributing emails at the beginning of the workday. In step 704, the server receives an email later on in the workday for multiple-recipients in the employee group. In step 706, the server determines if any of the intended recipients have already logged on. If one of the intended recipients has already logged on, the server sends the multiple-recipient email to that recipient's desktop computer in step 708. That recipient's personal or desktop computer then distributes the emails in step 710 following the procedures outlined in flowchart 600 for further distribution. The process then ends in step 712. If none of the intended recipients have logged on, the server sends the multiple-recipient emails to the first employee's personal or desktop computer in step 714, where they will be distributed according to the procedures outlined in flowchart 600.

Figure 8:
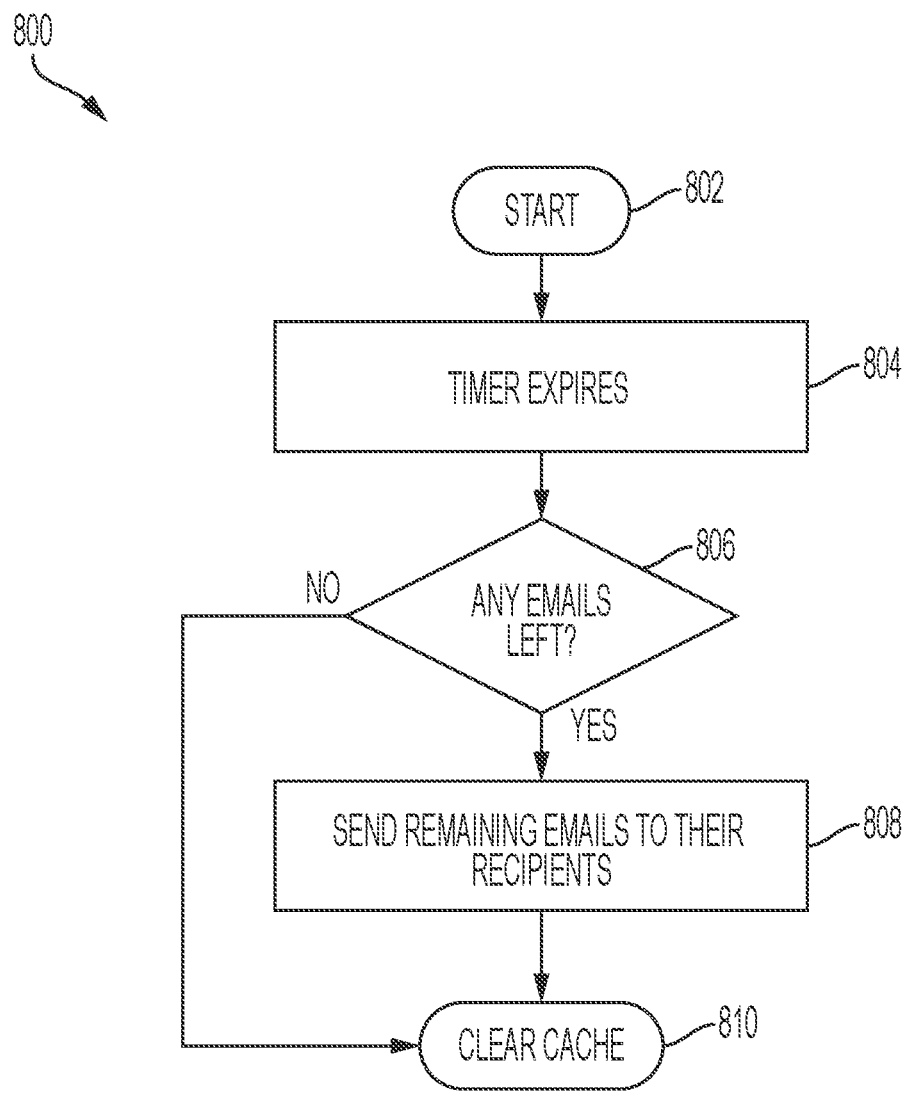
FIG. 8 is a flowchart showing the disposition of emails at the end of the workday, in an embodiment.

In one embodiment, some of the multiple-recipient emails held for distribution in the email caches in the various desktop computers are cleared out at the end of the workday, so that they do not accumulate ad infinitum. This process may be necessary because the first employee (or other employee whose computer includes multiple-recipient emails for distribution if the process shown in FIG. 7 was used for later-received emails) would normally not be allowed to delete any of the group emails until they have been delivered to their intended recipients. FIG. 8 is a flowchart 800 showing this process. The process starts in step 802, by setting a timer that determines when the clearing out process should start. For example, the timer may be set to start the clearing-out process at 6:00 pm, 10:00 pm, at midnight or later. In step 804, the timer expires at the selected time, and in step 806 the process determines whether there are any emails left that have not already been distributed to one or more of their intended recipients. If none are left, the email cache is cleared of the multiple-recipient emails in step 810 that do not include the first employee as one of the addressees. If any emails are left that have not already been distributed to their intended recipients, those emails are distributed to their intended recipients in step 808, and the cache is cleared out of emails that do not list the first employee (or other employee whose computer includes multiple-recipient emails for distribution if the process shown in FIG. 7 was used for later-received emails) as one of the addressees in step 810. To be clear, those emails that list the first employee (or other employee whose computer includes multiple-recipient emails for distribution if the process shown in FIG. 7 was used for later-received emails) as one of the addressees would not be cleared out, but the first employee (or other employee whose computer includes multiple-recipient emails for distribution if the process shown in FIG. 7 was used for later-received emails) would no longer be prevented from deleting those emails.

In another embodiment, the email cache in each of the group employees' personal or desktop computers may be divided into at least two sections. One section would be for emails addressed only to the specific employee, or to the specific employee and to others who are not in the employee group. The other section would be for emails addressed to her and to others in her group (and may also include others who are not in the group). These emails will be referred to below as "group emails." The email app moves a copy of these group emails into the section of her cache reserved for group emails, as described below. The addressees of the multiple-recipient emails who are not members of the group would have received their emails directly from the server in the normal course of the day.

Figure 9:
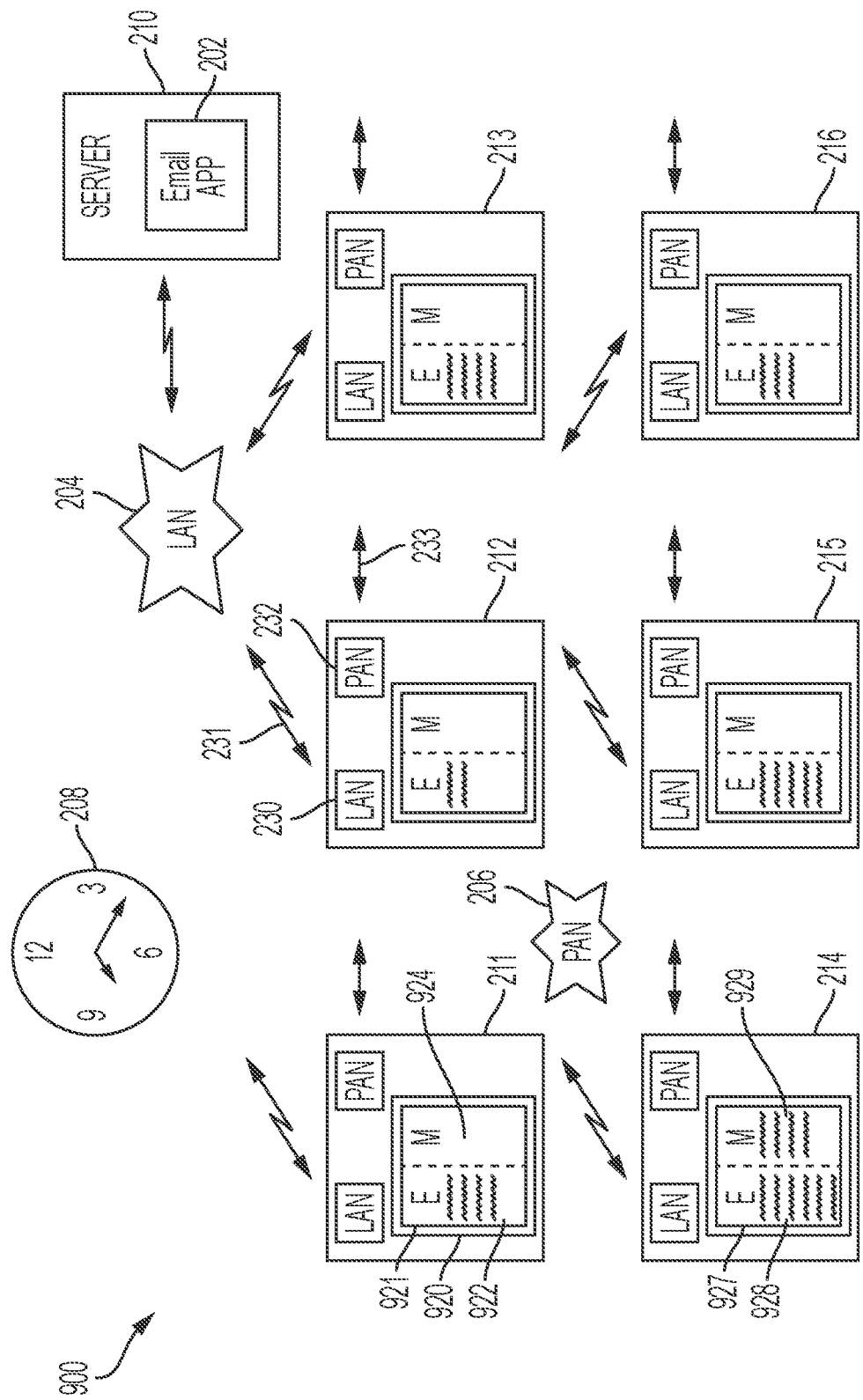
FIG. 9 is a schematic block diagram showing the disposition of emails on the employees' computers at the early time, in an embodiment.

In this embodiment, as illustrated in the schematic diagram 900 shown in FIG. 9, each of desktop computer 211, desktop computer 212, desktop computer 213, desktop computer 215 and desktop computer 216 has an email app 920. Each of the email apps 920 have a cache 921 that is divided into two or more sections, including a section 922 labeled "E" in FIG. 9 and a section 924 labeled "M" in FIG. 9. Section 922 is reserved for the employee's own emails, and section 924 is reserved for multiple-recipient emails that included at least one recipient within the employee group. Desktop computer 214 has an email cache 927 that is also divided into an "E" section and an "M" section, "E" section 928 and "M" section 929. Because the first employee to log on to the system network uses desktop computer 214, all of the multiple-recipient emails that include at least one addressee in the employee group are stored in the "M" section 929 of cache 927 in desktop computer 214. The "M" section 929 of cache 927 now contains all of the multi-recipient emails that have at least one addressee within the employee group. A copy of any of the multi-recipient emails that include the first employee as one of the addressees is then copied into the "E" section 928 of cache 927. At this time, the "M" sections of desktop computer 211, desktop computer 212, desktop computer 213, desktop computer 215 and desktop computer 216 do not yet have any emails.

Figure 10:
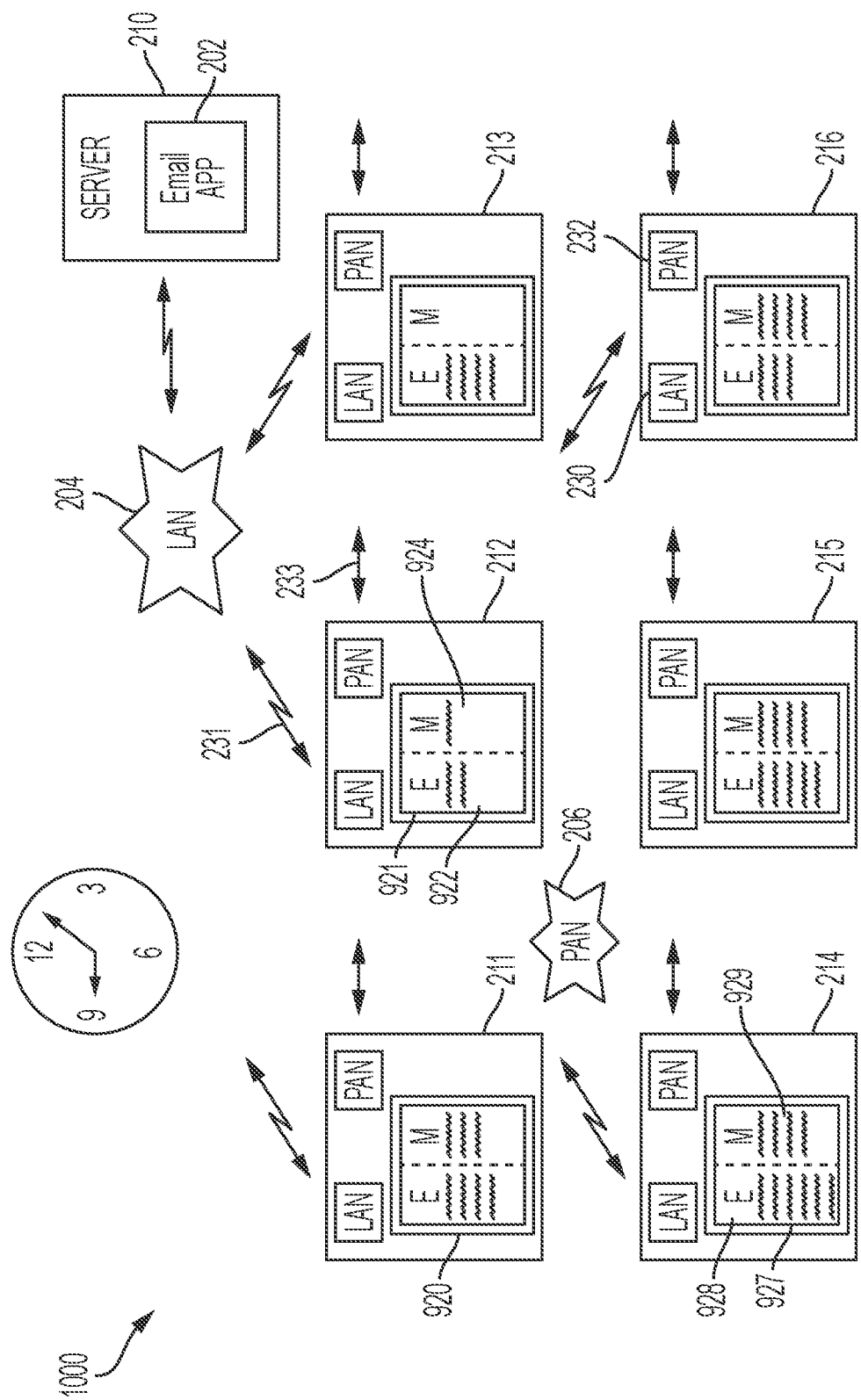
FIG. 10 is a schematic block diagram showing the disposition of emails on the employees' computers at the later time, in an embodiment.

FIG. 10 is a schematic diagram 1000 that shows the disposition of emails in the employees' desktop computers, desktop computer 211, desktop computer 212, desktop computer 213, desktop computer 214, desktop computer 215 and desktop computer 216 after the employees in the group have all logged in. In each of desktop computer 211, desktop computer 212, desktop computer 213, desktop computer 214, desktop computer 215 and desktop computer 216, email app 920 has an email cache 921 which has an "E" section" 922 and an "M" section 924. Because each of the employees has logged in, they each have emails in the "M" section 924 of their cache 921, except for the employee using desktop computer 213, who in this example was not an addressee on any of the multiple addressee emails received by that time.

Figure 11:
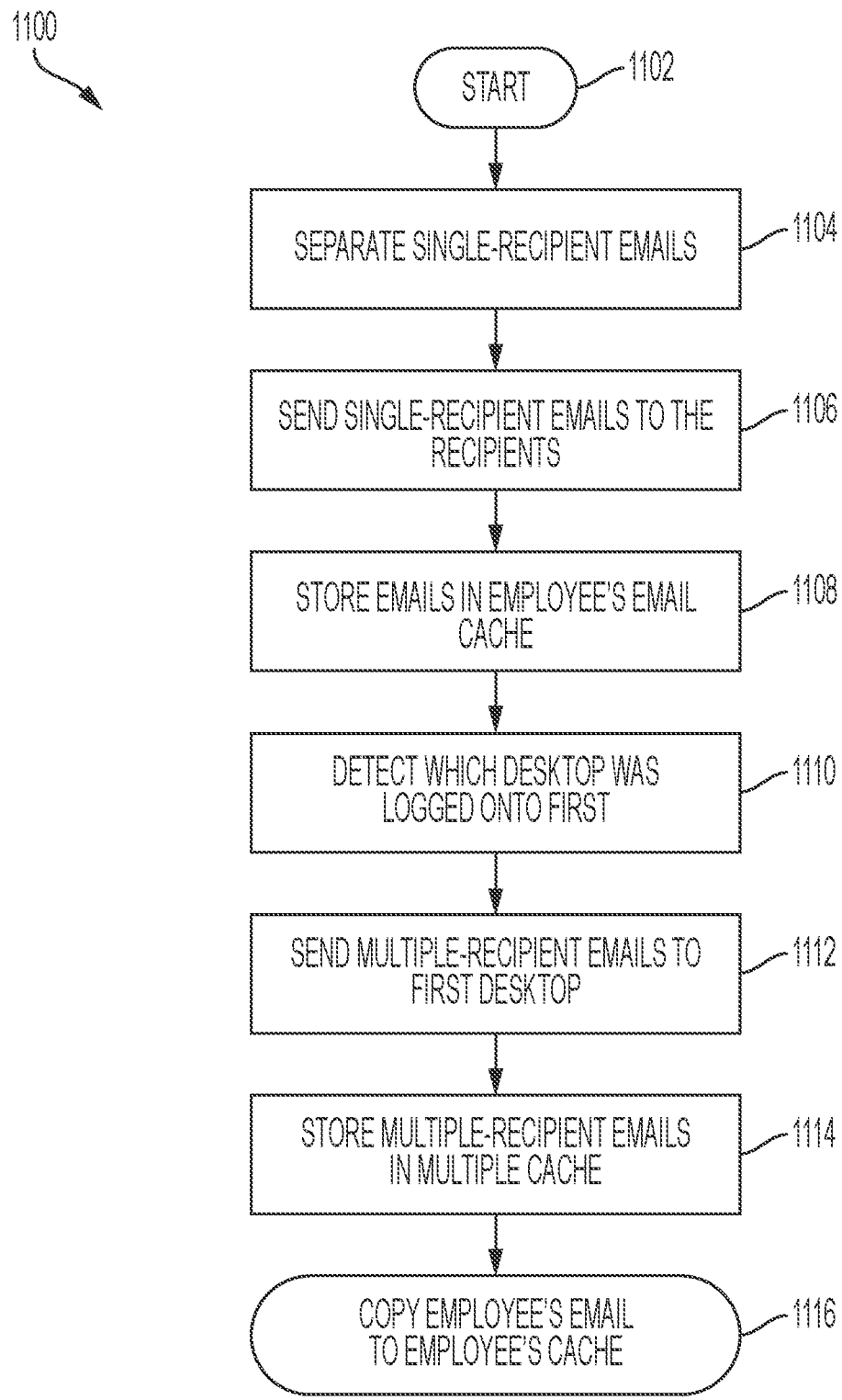
FIG. 11 is a flowchart showing the disposition of emails when the first employee logs on to the system, in an embodiment.
Figure 12:
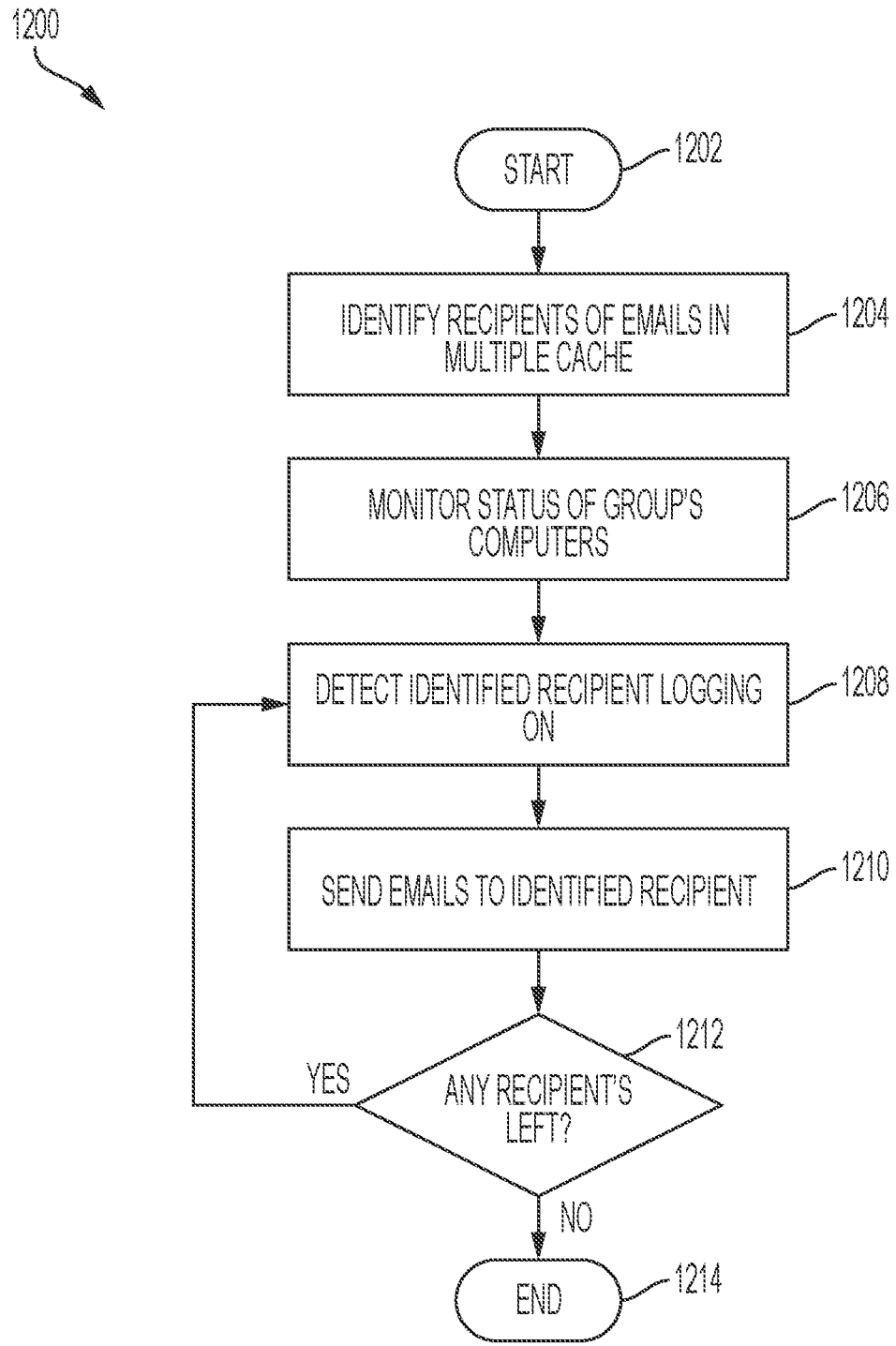
FIG. 12 is a flowchart showing the disposition of emails as recipients of the emails log on to start their workday, in an embodiment.

The processes used to implement this system are shown in FIG. 11 and FIG. 12. FIG. 11 is a flowchart 1100 showing the disposition of emails when the first employee logs on to the system. The process starts in step 1102 when the server may accumulate emails received after the employees have finished their workday, for possible transmission the following morning. In step 1104, the server separates single-recipient emails from multiple-recipient emails. In step 1106, the server sends single-recipient emails to their intended recipients. The server also sends the emails to those addressees who are not members of the group directly to those non-members. In step 1108, these emails are stored in section "E" of the recipients' email cache. The server then monitors the desktop computers of any employees that belong to the particular group of employees working in close proximity to each other, as described above, and determines which one of those employees' desktop computer was first used to log on in step 1110. In step 1112, the server then sends the multiple-recipient emails to that first desktop computer. In step 1114, the first desktop computer stores these multiple-recipient emails in the "M" section of its email cache. Then, in step 1116, the first desktop computer copies the emails which list the first employee as an addressee into the "E" section of the email cache.

FIG. 12 is a flowchart 1200 showing the disposition of emails as recipients of the emails log on to start their workday. The process starts in step 1202 after all of the multiple-recipient emails have been stored in the "M" section of the first employee's email cache. In step 1204, the first employee's desktop computer identifies the recipients of emails stored in the multiple email cache, apart from the first employee. In step 1206, the first employee's desktop computer monitors the status of the desktop computers assigned to the employees in the group. In step 1208, the first employee's desktop computer determines that one of the identified email recipients has logged on to the system, and sends copies of the emails that include the recipient as an addressee in step 1210. In step 1212, the first employee's desktop computer periodically checks to determine if any of the intended recipients of the emails stored in the "M" cache of first employee's desktop computer have not logged on yet. If the answer is "Yes," the process returns to step 1208, possibly after a delay, to continue the process. If the answer is "No," the process ends at step 1214.

The flowcharts shown in FIG. 7 and FIG. 8 apply to the FIG. 9 and FIG. 10 embodiments as well, with the understanding that the "clear cache" step in FIG. 8 refers to clearing the "M" caches of multi-recipient emails.

Although the sections of the email caches designated to store emails addressed to the specific person using that particular personal or desktop computer have been labeled as "E" sections, this should not be understood to mean that the "E" sections only refer to cache sections used by employees of a company or government agency. Instead, the "E" sections refer to the sections of emails designated to store emails addressed to the specific user who is a member of the group whose desks are in close proximity with each other and who have some common association, whether that user is an employee, a student, or a member of an organization or institution.

Other embodiments may include or alternatively use different sequences for managing the emails. For example, in another embodiment, once the emails for a particular set of intended recipients have been delivered, those emails may be immediately deleted from the first employee's email cache. Also, in some embodiments the steps shown in FIG. 5 to FIG. 8 and FIG. 11 to FIG. 12 may include appropriate delays between steps. In yet another embodiment, any multiple-recipient emails that are received during the course of the day may be sent to the personal computer of the first employee to log on for the workday, even if that first employee was not an addressee of that particular email. In that case, the emails would be processed according to the steps set forth in FIG. 6. Other modifications to the sequences shown in the drawings may also be implemented by those of skill in the art to maximize the operations of the particular environment.

Embodiments may also be used in contexts other than the email context. For example, text messages may be cached in one particular device (for example, a smartphone, a tablet, a laptop or a desktop computer) and then distributed to other devices when those devices are brought within range of that device's near-field communication capability, for example. They could also be re-transmitted at a subsequent time when the first device is not particularly busy.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for distributing emails to a group of persons who are users of personal computers that are in direct communication with each other over a personal area network, comprising:
   a processor;
   a server in communication with the personal computers;
   wherein the server is configured to:
   receive a number of multi-recipient emails addressed to at least one person in the group;
   send a first set of the multi-recipient emails classified as being at least one of confidential and restricted directly to their intended recipients;
   monitor the status of the personal computers, starting at a first predetermined time;
   identify an identified personal computer that was first used to access an email account, wherein the identified personal computer is configured to preclude a user of the identified personal computer from accessing emails that do not include that user as an addressee;
   distribute a second set of remaining multi-recipient emails to the identified personal computer, the identified personal computer then distributing the multi-recipient emails of the second set over the personal area network to each of the addressees of the multiple-recipient emails when each such addressee logs in to an email account; and
   wherein the multi-recipient emails classified as being at least one of confidential and restricted that are encrypted are distributed with the second set.

2. The system of claim 1, wherein the server is further configured to distribute the multi-recipient emails of the second set to any addressees of the multi-recipient emails who are not among the group of persons who are users of the personal computers that are in direct communication with each other over the personal area network.

3. The system of claim 1, wherein the identified personal computer grants priority access to computing resources to applications actually being executed on that particular personal computer, other than any applications being used to distribute the multi-recipient emails.

4. The system of claim 1, wherein the identified personal computer includes first applications that distribute the multi-recipient emails and second applications that are different than first applications, and wherein priority access to computing resources is granted to the second applications.

5. The system of claim 1, wherein the identified personal computer is configured to preclude the user of the identified personal computer from seeing emails that do not include that user as an addressee.

6. The system of claim 1, wherein an email cache of the identified personal computer is cleared of multi-recipient emails that have already been delivered to their recipients at a second predetermined time.

7. The system of claim 1, wherein the server is also configured to download any multi-recipient emails received after the first predetermined time into an email cache of one of the personal computers for subsequent distribution.

8. A method for distributing emails to a group of personal computers that are in communication with each other over a personal area network, the method comprising:
   receiving, at a server, a number of multi-recipient emails addressed to at least one person in the group;
   sending, by the server, a first set of the multi-recipient emails classified as being at least one of confidential and restricted directly to their intended recipients;
   monitoring, by the server, the status of the personal computers, starting at a first predetermined time;
   identifying, by the server, an identified personal computer among the group of personal computers that was first used to access an email account;
   wherein the identified personal computer precludes an associated user from accessing any of the multi-recipient emails that do not list the associated user as an addressee;
   distributing, by the server, a second set of multi-recipient emails to the identified personal computer, the identified personal computer then distributing the second set of multi-recipient emails using the personal area network to each of the addressees of the multiple-recipient emails when each such addressee logs in to an email account; and
   wherein the second set of multi-recipient emails includes encrypted multi-recipient emails classified as being at least one of confidential and restricted.

9. The method of claim 8, wherein the distributing, by the server, the multi-recipient emails of the second set to any addressees of the multi-recipient emails who are not among the group of persons who are users of the personal computers that are in direct communication with each other over the personal area network may be performed any time after the receipt of the multi-recipient emails.

10. The method of claim 8, wherein the server distributes the second set of multi-recipient emails to a second group of personal computers that is different than the group of personal computers.

11. The method of claim 8, wherein the identified personal computer precludes the associated user from seeing any of the multi-recipient emails that do not list the associated user as an addressee.

12. The method of claim 8, wherein the identified personal computer distributing the multi-recipient emails to each of the addressees of the multiple-recipient emails stores the multiple-recipient emails in an email cache.

13. The method of claim 8, further comprising downloading, by the server, any multi-recipient emails received after the first predetermined time into an email cache of one of the personal computers for subsequent distribution.

14. The method of claim 8, wherein the identified personal computer includes first applications that distribute the multi-recipient emails and second applications that are different than first applications, and wherein priority access to computing resources is granted to the second applications.

15. The method of claim 8, wherein any multi-recipient emails that have not already been distributed are distributed at a second predetermined time after the first predetermined time.

16. A non-transitory computer readable medium storing software comprising instructions executable by at least one computer, which, upon such execution, cause the at least one computer to perform a method for distributing emails to a group of personal computers that are in communication with each other over a personal area network, the method comprising:
   receiving, at a server, a number of multi-recipient emails addressed to at least one person in the group;
   sending, by the server, a first set of the multi-recipient emails classified as being at least one of confidential and restricted directly to their intended recipients;
   monitoring, by the server, the status of the personal computers, starting at a first predetermined time;
   identifying, by the server, an identified personal computer that was first used to access an email account; and
   distributing, by the server, a second set of remaining multi-recipient emails to the identified personal computer, the identified personal computer then distributing the second set of multi-recipient emails using the personal area network to each of the addressees of the multiple-recipient emails after each such addressee logs in to an email account;
   wherein the multi-recipient emails classified as being at least one of confidential and restricted that are encrypted are distributed with the second set; and
   wherein a person who is a user of the identified personal computer is precluded from accessing any of the multi-recipient emails that do not list the person who is the user of the identified personal computer as an addressee.

17. The non-transitory computer readable medium of claim 16, wherein the identified personal computer includes first applications that distribute the multi-recipient emails and second applications that are different than first applications, and wherein priority access to computing resources is granted to the second applications.

18. The non-transitory computer readable medium of claim 16, wherein the server is also configured to download any multi-recipient emails received after the first predetermined time into an email cache of one of the personal computers for subsequent distribution.

19. The non-transitory computer readable medium of claim 16, wherein the identified personal computer precludes an associated user from seeing any of the multi-recipient emails that do not list the person who is the user of the identified personal computer as an addressee.

20. The non-transitory computer readable medium of claim 16, wherein the method further comprises distributing, by the server, the multi-recipient emails of the second set to any addressees of the multi-recipient emails who are not among the group of persons who are users of the personal computers that are in direct communication with each other over the personal area network, wherein this step may be performed any time after the receipt of the multi-recipient emails.

* * * * *